US005752223A

United States Patent [19]

Aoyagi et al.

[11] Patent Number: 5,752,223

[45] Date of Patent: May 12, 1998

[54] CODE-EXCITED LINEAR PREDICTIVE CODER AND DECODER WITH CONVERSION FILTER FOR CONVERTING STOCHASTIC AND IMPULSIVE EXCITATION SIGNALS

[75] Inventors: Hiromi Aoyagi; Yoshihiro Ariyama; Kenichiro Hosoda, all of Tokyo, Japan

[73] Assignee: Oki Electric Industry Co., Ltd., Tokyo, Japan

[21] Appl. No.: 557,809

[22] Filed: Nov. 14, 1995

[30] Foreign Application Priority Data

Nov. 22, 1994 [JP] Japan .................................... 6-287654

[51] Int. Cl.[6] .................................................. G01L 9/14

[52] U.S. Cl. .......................... 704/219; 704/223; 704/262; 704/264; 704/278

[58] Field of Search ................................ 395/2.28, 2.32, 395/2.71, 2.73, 2.87; 704/219, 223, 262, 264, 278

[56] References Cited

U.S. PATENT DOCUMENTS

| | | | |
|---|---|---|---|
| 4,435,832 | 3/1984 | Asada et al. | 395/2.71 |
| 4,624,012 | 11/1986 | Lin et al. | 395/2.7 |
| 4,975,958 | 12/1990 | Hanada et al. | 395/2.32 |
| 5,138,661 | 8/1992 | Zinser et al. | 395/2.28 |
| 5,195,137 | 3/1993 | Swaminathan | 395/2.31 |
| 5,305,420 | 4/1994 | Nakamura et al. | 398/2.81 |
| 5,327,521 | 7/1994 | Savic et al. | 395/2.81 |
| 5,341,432 | 8/1994 | Suzuki et al. | 395/2.2 |
| 5,479,564 | 12/1995 | Vogten et al. | 395/2.76 |
| 5,537,509 | 7/1996 | Swaminathan et al. | 395/2.37 |

OTHER PUBLICATIONS

Allen Gersho, "Advances in Speech and Audio Compression," Proc. IEEE, vol. 82, No. 6, pp. 900–918, Jun. 1994.

*Primary Examiner*—Allen R. MacDonald
*Assistant Examiner*—Tālivaldisli Ivars Šmits
*Attorney, Agent, or Firm*—Rabin, Champagne, & Lynt, P.C.

[57] ABSTRACT

A code-excited linear predictive coder or decoder for a speech signal has an adaptive codebook, a stochastic codebook, and a pulse codebook. A constant excitation signal is obtained by choosing between a stochastic excitation signal selected from the stochastic codebook and an impulsive excitation signal selected from the pulse codebook. The constant excitation signal is filtered to produce a varied excitation signal more closely resembling the original speech signal. The varied excitation signal is combined with an adaptive excitation signal selected from the adaptive codebook to produce a final excitation signal, which is filtered to generate a synthesized speech signal. The final excitation signal is also used to update the adaptive codebook.

45 Claims, 9 Drawing Sheets

CODE-EXCITED LINEAR PREDICTIVE CODER AND DECODER WITH CONVERSION FILTER FOR CONVERTING STOCHASTIC AND IMPULSIVE EXCITATION SIGNALS

RELATED APPLICATIONS

This application is related to allowed application Ser. No. 08/379,653 by Kenichiro Hosoda et al. entitled "Code Excitation Linear Predictive (CELP) Encoder and Decoder and Code Excitation Linear Predictive Coding Method", filed Feb. 2, 1995.

BACKGROUND OF THE INVENTION

The present invention relates to a code-excited linear predictive coder and decoder having features suitable for use in, for example, a telephone answering machine.

Telephone answering machines have generally employed magnetic cassette tape as the medium for recording incoming and outgoing messages. Cassette tape offers the advantage of ample recording time, but has the disadvantage that the recording and playing apparatus takes up considerable space, and the further disadvantage of being unsuitable for various desired operations. These operations include selective erasing of messages, monotone playback, and rapidly checking through a large number of messages by reproducing only the initial portion of each message, preferably at a speed faster than normal speaking speed.

The disadvantages of cassette tape have led manufacturers to consider the use of semiconductor integrated-circuit memory (referred to below as IC memory) as a message recording medium. At present, IC memory can be employed for recording outgoing greeting messages, but is not useful for recording incoming messages, because of the large amount of memory required. For IC memory to become more useful, it must be possible to store more messages in less memory space, by recording messages with adequate quality at very low bit rates.

Linear predictive coding (LPC) is a well-known method of coding speech at low bit rates. An LPC decoder synthesizes speech by passing an excitation signal through a filter that mimics the human vocal tract. An LPC coder codes the speech signal by specifying the filter coefficients, the type of excitation signal, and its power.

Various types of excitation signals have been used in linear predictive coding. The traditional LPC vocoder, for example, generates voiced sounds from a pitch-pulse excitation signal (an isolated impulse repeated at regular intervals), and unvoiced sounds from a white-noise excitation signal. This vocoder system does not provide acceptable speech quality at very low bit rates.

Code-excited linear prediction (CELP) employs excitation signals drawn from a codebook. The CELP coder finds the optimum excitation signal by making an exhaustive search of its codebook, then outputs a corresponding index value. The CELP decoder accesses an identical codebook by this index value and reads out the excitation signal.

More than one codebook may be employed. One CELP system, for example, has a stochastic codebook of fixed white-noise signals, and an adaptive codebook structured as a shift register. A signal selected from the stochastic codebook is mixed with a selected segment of the adaptive codebook to obtain the excitation signal, which is then shifted into the adaptive codebook to update its contents.

CELP coding provides improved speech quality at low bit rates, but at the very low bit rates desired for recording messages in an IC memory in a telephone set, CELP speech quality has still proven unsatisfactory. The most strongly impulsive and periodic speech waveforms, occurring at the onset of voiced sounds, for example, are not reproduced adequately. Very low bit rates also tend to create irritating distortions and quantization noise.

SUMMARY OF THE INVENTION

The present invention offers an improved CELP system that appears capable of overcoming the above problems associated with very low bit rates, and has features useful in telephone answering machines.

One object of the invention is to provide a CELP coder and decoder that can reproduce strongly periodic speech waveforms satisfactorily, even at low bit rates.

Another object is to mask the quantization noise that occurs at low bit rates.

A further object is to reduce distortion at low bit rates.

Yet another object is to provide means of dealing with nuisance calls.

Still another object is to provide a simple means of varying the playback speed of the reproduced speech signal without changing the pitch.

According to a first aspect of the invention, a CELP coder and decoder for a speech signal each have an adaptive codebook, a stochastic codebook, a pulse codebook, and a gain codebook. An adaptive excitation signal, corresponding to an adaptive index, is selected from the adaptive codebook. A stochastic excitation signal is selected from the stochastic codebook. An impulsive excitation signal is selected from the pulse codebook. A constant excitation signal is selected by choosing between the stochastic excitation signal and the impulsive excitation signal. A pair of gain values is selected from the gain codebook.

The constant excitation signal is filtered, using filter coefficients derived from the adaptive index and from linear predictive coefficients calculated in the coder. The constant excitation signal is thereby converted to a varied excitation signal more closely resembling the original speech signal input to the coder. The varied excitation signal and adaptive excitation signal are combined according to the selected pair of gain values to produce a final excitation signal. The final excitation signal is filtered, using the above-mentioned linear predictive coefficients, to produce a synthesized speech signal, and is also used to update the contents of the adaptive codebook.

The linear predictive coefficients are obtained in the coder by performing a linear predictive analysis, converting the analysis results to line-spectrum-pair coefficients, quantizing and dequantizing the line-spectrum-pair coefficients, and reconverting the dequantized line-spectrum-pair coefficients to linear predictive coefficients.

The speech signal is coded by searching the adaptive, stochastic, pulse, and gain codebooks to find the optimum excitation signals and gain values, which produce a synthesized speech signal most closely resembling the input speech signal. The coded speech signal contains the indexes of the optimum excitation signals, the quantized line-spectrum-pair coefficients, and a quantized power value.

According to a second aspect of the invention, monotone speech is produced by holding the adaptive index fixed in the coder, or in the decoder.

According to a third aspect of the invention, the speed of the coded speech signal is controlled by detecting periodicity in the input speech signal and deleting or interpolating portions of the input speech signal with lengths corresponding to the detected periodicity.

According to a fourth aspect of the invention, the speed of the synthesized speech signal is controlled by detecting periodicity in the final excitation signal and deleting or interpolating portions of the final excitation signal with lengths corresponding to the detected periodicity.

According to a fifth aspect of the invention, after the synthesized speech signal has been produced in the decoder, a white-noise signal is added to the final reproduced speech signal.

According to a sixth aspect of the invention, the stochastic codebook and pulse codebook are combined into a single codebook.

DETAILED DESCRIPTION OF THE PREFERRED EMBODIMENTS

Several embodiments of the invention will now be described with reference to the attached illustrative drawings, and features useful in telephone answering machines will be pointed out.

First coder embodiment

Figure 1:
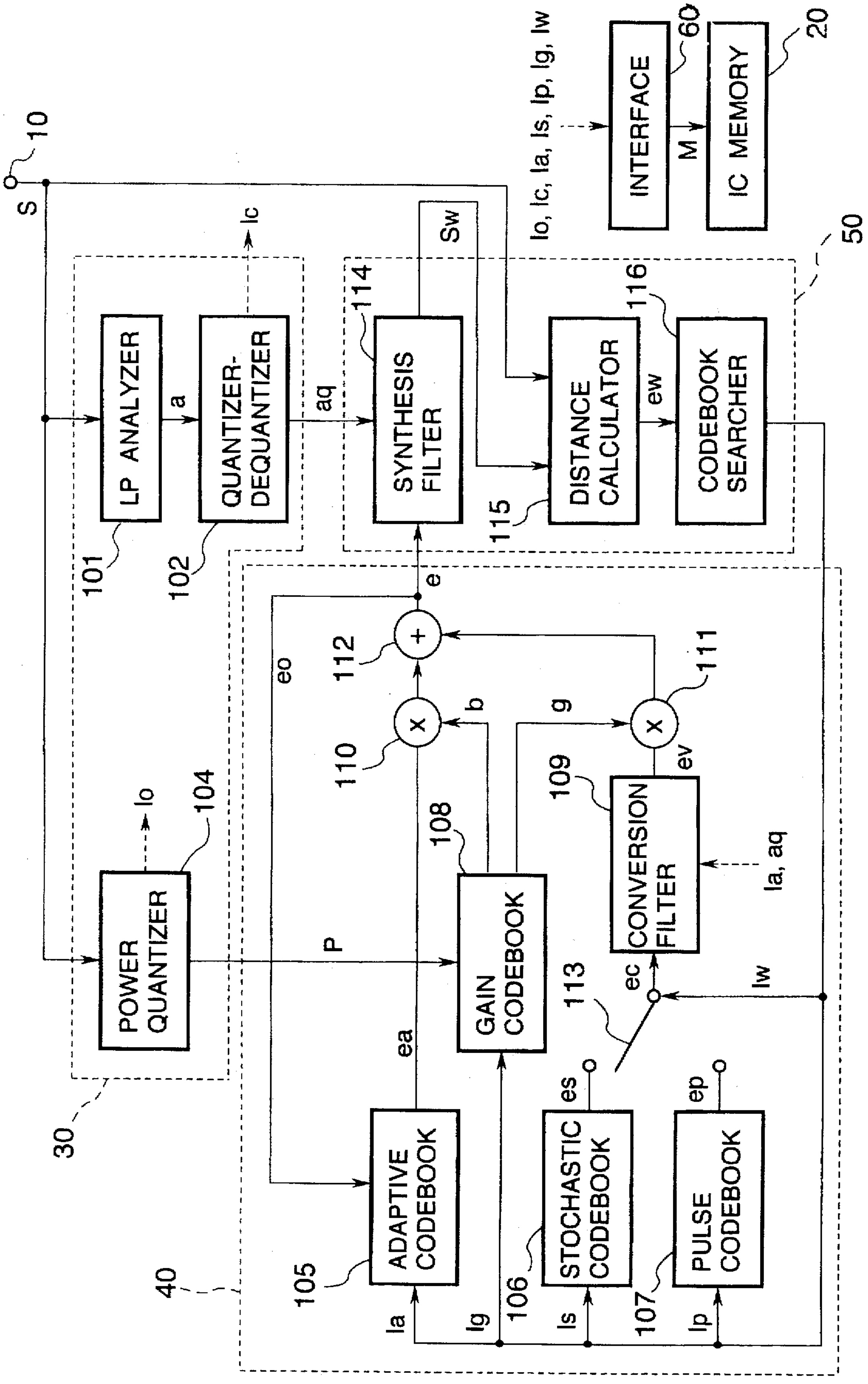
FIG. 1 is a block diagram of a first embodiment of the invented CELP coder.

FIG. 1 shows a first embodiment of the invented CELP coder. The coder receives a digitized speech signal S at an input terminal 10, and outputs a coded speech signal M, which is stored in an IC memory 20. The digitized speech signal S consists of samples of an analog speech signal. The samples are grouped into frames consisting of a certain fixed number of samples each. Each frame is divided into subframes consisting of a smaller fixed number of samples. The coded speech signal M contains index values, coefficient information, and other information pertaining to these frames and subframes. The IC memory is disposed in, for example, a telephone set with a message recording function.

The coder comprises the following main functional circuit blocks: an analysis and quantization circuit 30, which receives the input speech signal S and generates a dequantized power value (P) and a set of dequantized linear predictive coefficients (aq); an excitation circuit 40, which outputs an excitation signal (e); an optimizing circuit 50, which selects an optimum excitation signal (eo); and an interface circuit 60, which writes power information Io, coefficient information Ic, and index information Ia, Is, Ip, Ig, and Iw in the IC memory 20.

In the analysis and quantization circuit 30, a linear predictive analyzer 101 performs a forward linear predictive analysis on each frame of the input speech signal S to obtain a set of linear predictive coefficients (a). These coefficients (a) are passed to a quantizer-dequantizer 102 that converts them to a set of line-spectrum-pair (LSP) coefficients, quantizes the LSP coefficients, using a vector quantization scheme, to obtain the above-mentioned coefficient information Ic, then dequantizes this information Ic and converts the result back to linear-predictive coefficients, which are output as the dequantized linear predictive coefficients (aq). One set of dequantized linear predictive coefficients (aq) is output per frame.

A power quantizer 104 in the analysis and quantization circuit 30 computes the power of each frame of the input speech signal S, quantizes the computed value to obtain the power information Io, then dequantizes this information Io to obtain the dequantized power value P.

The excitation circuit 40 has four codebooks: an adaptive codebook 105, a stochastic codebook 106, a pulse codebook 107, and a gain codebook 108. The excitation circuit 40 also comprises a conversion filter 109, a pair of multipliers 110 and 111, an adder 112, and a selector 113.

The adaptive codebook 105 stores a history of the optimum excitation signal (eo) from the present to a certain distance back in the past. Like the input speech signal, the excitation signal consists of sample values; the adaptive codebook 105 stores the most recent N sample values, where N is a fixed positive integer. The history is updated each time a new optimum excitation signal is selected. In response to what will be termed an adaptive index Ia, the adaptive codebook 105 outputs a segment of this past history to the first multiplier 110 as an adaptive excitation signal (ea). The output segment has a length equal to one subframe.

Figure 10:
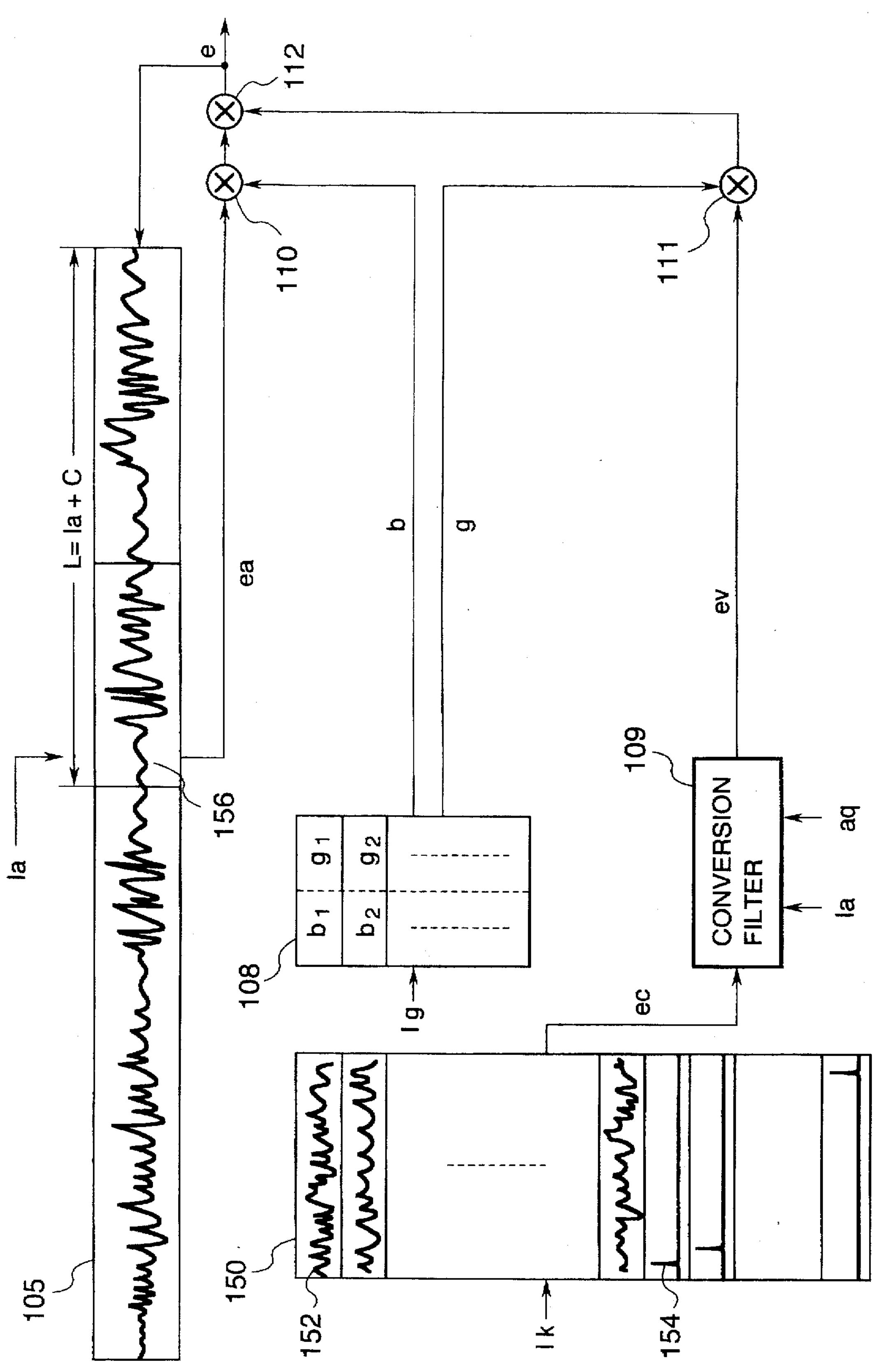
FIG. 10 is a block diagram illustrating a modification of the excitation circuit in the embodiments above.

The adaptive codebook 105 thus provides an overlapping series of candidate waveforms which can be output as the adaptive excitation signal (ea). The adaptive index Ia specifies the point in the stored history at which the output waveform starts. The distance from this point to the present point (the most recent sample stored in the adaptive codebook 105) is termed the pitch lag, as it is related to the periodicity or pitch of the speech signal. The adaptive codebook structure will be illustrated later (FIG. 10).

The stochastic codebook 106 stores a plurality of white-noise waveforms. Each waveform is stored as a separate series of sample values, of length equal to one subframe. In response to a stochastic index Is, one of the stored waveforms is output to the selector 113 as a stochastic excitation signal (es). The waveforms in the stochastic codebook 106 are not updated.

The pulse codebook 107 stores a plurality of impulsive waveforms. Each waveform consists of a single, isolated impulse at a position specified by pulse index Ip. Each waveform is stored as a series of sample values, all but one of which are zero. The waveform length is equal to one subframe. In response to the pulse index Ip, the corresponding impulsive waveform is output to the selector 113 as an impulsive excitation signal (ep). The impulsive waveforms in the pulse codebook 107 are not updated.

The stochastic and pulse codebooks 106 and 107 preferably both contain the same number of waveforms, so that the stochastic and pulse indexes Is and Ip can efficiently have the same bit length.

The gain codebook 108 stores a plurality of pairs of gain values, which are output in response to a gain index Ig. The first gain value (b) in each pair is output to the first multiplier 110, and the second gain value (g) to the second multiplier 112. Before being output, the gain values are scaled according to the dequantized power value P, but the pairs of gain values stored in the gain codebook 108 are not updated.

The selector 113 selects the stochastic excitation signal (es) or impulsive excitation signal (ep) according to a one-bit selection index Iw, and outputs the selected excitation signal as a constant excitation signal (ec) to the conversion filter 109. The coefficients employed in this conversion filter 109 are derived from the adaptive index (Ia), which is received from the optimizing circuit 50, and the dequantized linear predictive coefficients (aq), which are received from the quantizer-dequantizer 102. The filtering operation converts the constant excitation signal (ec) to a varied excitation signal (ev), which is output to the second multiplier 111.

The multipliers 110 and 111 multiply their respective inputs, and furnish the resulting gain-controlled excitation signals to the adder 112, which adds them to produce the final excitation signal (e) furnished to the optimizing circuit 50. When an optimum excitation signal (eo) has been determined, this signal is also supplied to the adaptive codebook 105 and added to the past history stored therein.

The optimizing circuit 50 consists of a synthesis filter 114, a perceptual distance calculator 115, and a codebook searcher 116.

The synthesis filter 114 convolves each excitation signal (e) with the dequantized linear predictive coefficients (aq) to produce the locally synthesized speech signal Sw. The dequantized linear predictive coefficients (aq) are updated once per frame.

The perceptual distance calculator 115 computes a sum of the squares of weighted differences between the sample values of the input speech signal S and the corresponding sample values of the locally synthesized speech signal Sw. The weighting is accomplished by passing the differences through a filter that reflects the sensitivity of the human ear to different frequencies. The sum of squares (ew) thus represents the perceptual distance between the input and synthesized speech signals S and Sw.

The codebook searcher 116 searches in the codebooks 105, 106, 107, and 108 for the combination of excitation waveforms and gain values that minimizes the perceptual distance (ew). This combination generates the above-mentioned optimum excitation signal (eo).

The interface circuit 60 formats the power information Io and coefficient information Ic pertaining to each frame of the input speech signal S, and the index information pertaining to the optimum excitation signal (eo) in each subframe, for storage in the IC memory 20 as the coded speech signal M. The index information includes the adaptive, gain, and selection indexes Ia, Ig, and Iw, and either the stochastic index Is or pulse index Ip, depending on the value of the selection index Iw. The stored stochastic or pulse index Is or Ip will also be referred to as the constant index.

Although not explicitly indicated in the drawing, the interface circuit 60 is coupled to the quantizer-dequantizer 102, power quantizer 104, and codebook searcher 116.

Detailed descriptions of the circuit configurations of the above elements will be omitted. All of them can be constructed from well-known computational and memory circuits. The entire coder, including the IC memory 20, can be built using a small number of integrated circuits (ICs).

Next the operation of the coder in FIG. 1 will be described. Procedures for performing linear predictive analysis, calculating LSP coefficients, calculating power, and calculating perceptual distance are well known, so the description will focus on the generation of the excitation signal and the codebook search procedure.

The described search will be carried out by taking one codebook at a time, in the following sequence: adaptive codebook 105, stochastic codebook 106, pulse codebook 107, then gain codebook 108. The invention is not limited, however, to this search sequence; any search procedure that yields an optimum excitation signal can be used.

To find the optimum adaptive excitation signal, the codebook searcher 116 sends the stochastic codebook 106 and pulse codebook 107 arbitrary index values, and sends the gain codebook 108 a gain index causing it to output, for example, a first gain value (b) of P and a second gain value (g) of zero. Under these conditions, the codebook searcher 116 sends the adaptive codebook 105 all of the adaptive indexes Ia in sequence, causing the adaptive codebook 105 to output all of its candidate waveforms as adaptive excitation signals (ea), one after another. The resulting excitation signals (e) are identical to these adaptive excitation signals (ea) scaled by the dequantized power value P.

The synthesis filter 40 convolves each of these excitation signals (e) with the dequantized linear predictive coefficients (aq). The perceptual distance calculator 115 computes the perceptual distance (ew) between each resulting synthesized speech signal Sw and the current subframe of the input speech signal S. The codebook searcher 116 selects the adaptive index Ia that yields the minimum perceptual distance (ew). If the minimum perceptual distance is produced by two or more adaptive indexes Ia, one of these indexes (the least index, for example), is selected. The selected adaptive index Ia will be referred to as the optimum adaptive index.

Next, the optimum stochastic excitation signal is found by a similar search of the stochastic codebook 106. The codebook searcher 116 sends the optimum adaptive index Ia to the adaptive codebook 105 and conversion filter 109, sends a selection index Iw to the selector 113 causing it to select the stochastic excitation signal (es), and sends a gain index Ig to the gain codebook 108 causing it to output, for example, a first gain value (b) of zero and a second gain value (g) of P. The codebook searcher 116 then outputs all of the stochastic index values Is in sequence, causing the stochastic codebook 106 to output all of its stored waveforms, and selects the waveform that yields the synthesized speech signal Sw with the least perceptual distance (ew) from the input speech signal S.

During this search of the stochastic codebook 106, the conversion filter 109 filters each stochastic excitation signal (es). The filtering operation can be described in terms of its transfer function H(z), which is the z-transform of the impulse response of the conversion filter. One preferred transfer function is the following:

$$H(z)=\frac{1-\sum_{j=1}^{p} A^j aq_j z^{-j}}{\left(1-\sum_{j=1}^{p} B^j aq_j z^{-j}\right)(1-\epsilon z^{-L})}$$

In this equation, p is the number of dequantized linear predictive coefficients (aq) generated by the analysis and quantization circuit 30. The j-th coefficient is denoted $aq_j$ ($j=1, \ldots, p$). L is the pitch lag corresponding to the optimum adaptive index. A and B are constants such that $0<A<B<1$, and $\epsilon$ is a constant such that $0<\epsilon\leq 1$.

The coefficients $aq_j$ contain information about the short-term behavior of the input speech signal S. The pitch lag L describes its longer-term periodicity. The result of the filtering operation is to convert the stochastic excitation signal (es) to a varied excitation signal (ev) with frequency characteristics more closely resembling the frequency characteristics of the input speech signal S. The excitation signal (e) is the varied excitation signal (ev) scaled by the dequantized power value P.

A search is next made for the optimum impulsive excitation signal (ep). The same procedure is followed as in the search for the optimum stochastic excitation signal, except that the codebook searcher 116 now outputs a selection index Iw causing the selector 113 to select the impulsive excitation signal (ep), and sends the pulse codebook 107 all of the pulse indexes Ip. The conversion filter 109 filters the impulsive excitation signals (ep) in the same way that the stochastic excitation signals (es) were filtered.

If a conversion filter with a transfer function like the above H(z) is employed, the varied excitation signal (ev) contains pulse clusters that start at a position determined by the pulse index Ip, have a shape determined by the dequantized linear predictive coefficients (aq), repeat periodically at intervals equal to the pitch lag L determined by the adaptive index Ia, and decay a rate determined by the constant $\epsilon$. Compared with the impulsive excitation signal (ep), or with a conventional pitch-pulse excitation signal, this varied excitation signal (ev) also has frequency characteristics that more closely resemble those of the input speech signal S.

After finding the optimum impulsive excitation signal (ep), the codebook searcher 116 compares the perceptual distances (ew) calculated for the optimum impulsive and optimum stochastic excitation signals (es and ep), and selects the optimum signal (es or ep) that gives the least perceptual distance (ew) as the optimum constant excitation signal (ec). The corresponding selection index Iw becomes the optimum selection index.

Next, a search is made for the optimum gain index. The codebook searcher 116 outputs the optimum adaptive index (Ia) and optimum selection index (Iw), and either the optimum stochastic index (Is) or the optimum pulse index (Ip), depending on which signal is selected by the optimum selection index (Iw). All values of the gain index Ig are then produced in sequence, causing the gain codebook 108 to output all stored pairs of gain values. These pairs of gain values represent different mixtures of the adaptive and varied excitation signals (ea and ev). These gain values can also adjust the total power of the excitation signal. As before, the codebook searcher 116 selects, as the optimum gain index, the gain index that minimizes the perceptual distance (ew) from the input speech signal S.

When the optimum adaptive excitation signal, optimum constant excitation signal, and optimum pair of gain values have been found as described above, the codebook searcher 116 furnishes the indexes Ia, Iw, Is or Ip, and Ig that select these signals and values to the interface circuit 60, to be written in the IC memory 20. In addition, these optimum indexes are supplied to the excitation circuit 40 to generate the optimum excitation signal (eo) once more, and this optimum excitation signal (eo) is routed from the adder 112 to the adaptive codebook 105, where it becomes the new most-recent segment of the stored history. The oldest one-subframe portion of the history stored in the adaptive codebook 105 is deleted to make room for this new segment (eo). After the adaptive codebook 105 has been updated in this way, the search for an optimum excitation signal in the next subframe begins.

First Decoder Embodiment

Figure 2:
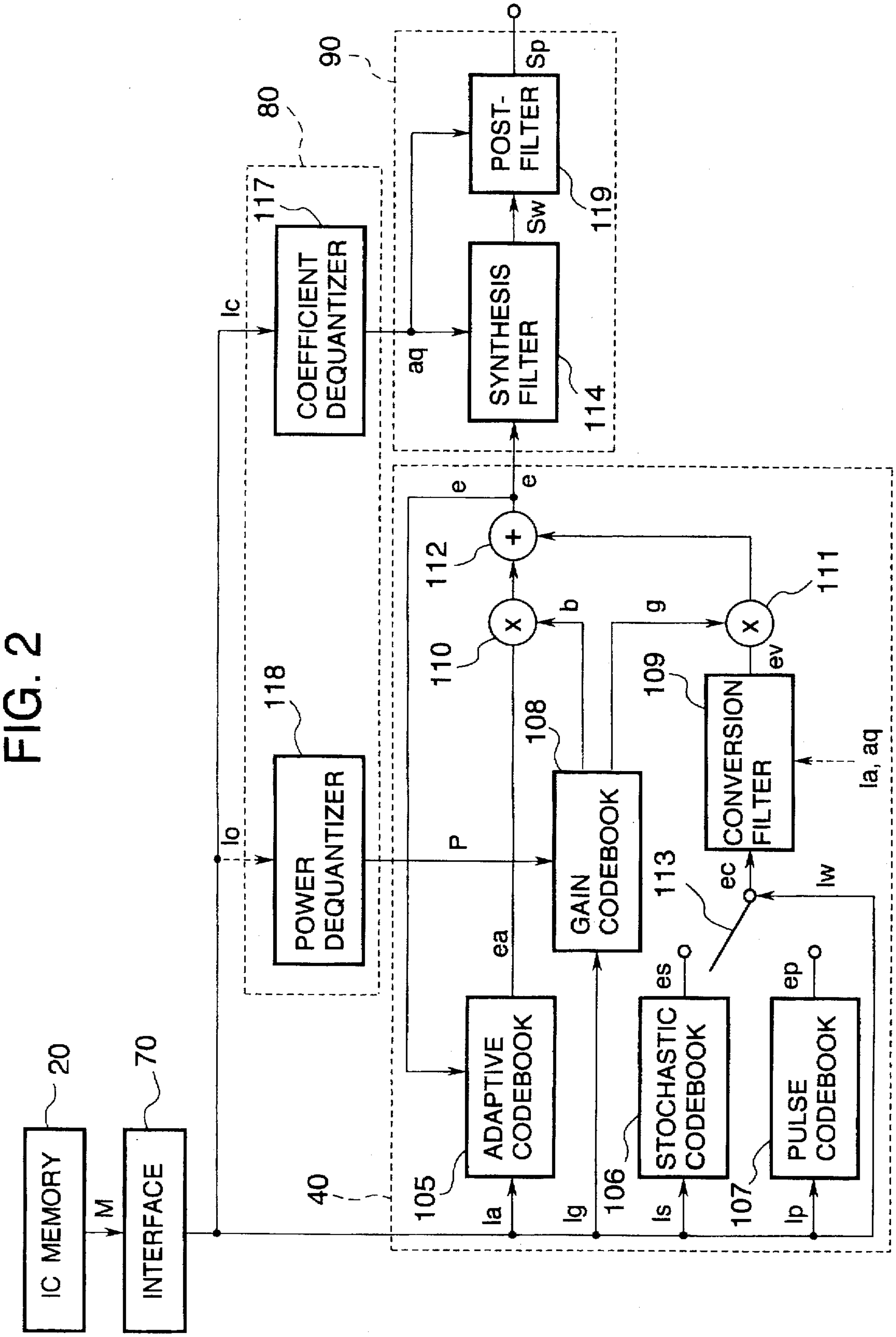
FIG. 2 is a block diagram of a first embodiment of the invented CELP decoder.

FIG. 2 shows a first embodiment of the invented CELP decoder. The decoder generates a reproduced speech signal Sp from the coded speech signal M stored in the IC memory 20 by the coder in FIG. 1. The decoder comprises the following main functional circuit blocks: an interface circuit 70, a dequantization circuit 80, an excitation circuit 40, and a filtering circuit 90.

The interface circuit 70 reads the coded speech signal M from the IC memory 20 to obtain power, coefficient, and index information. Power information Io and coefficient information Ic are read once per frame. Index information (Ia, Iw, Is or Ip, and Ig) is read once per subframe. The index information includes a constant index that is interpreted as either a stochastic index (Is) or pulse index (Ip), depending on the value of the selection index (Iw).

The dequantizing circuit 80 comprises a coefficient dequantizer 117 and power dequantizer 118. The coefficient dequantizer 117 dequantizes the coefficient information Ic to obtain LSP coefficients, which it then converts to dequantized linear predictive coefficients (aq) as in the coder. The power dequantizer 118 dequantizes the power information Io to obtain the dequantized power value P.

The excitation circuit 40 is identical to the excitation circuit 40 in the coder in FIG. 1. The same reference numerals are used for this circuit in both drawings.

The filtering circuit 90 comprises a synthesis filter 114 identical to the one in FIG. 1, and a post-filter 119. The post-filter 119 filters the synthesized speech signal Sw, using information obtained from the dequantized linear predictive coefficients (aq) supplied by the coefficient dequantizer 117, to compensate for frequency characteristics of the human auditory sense, thereby generating the reproduced speech signal Sp. A detailed description of this filtering operation will be omitted, as post-filtering is well known in the art.

The operation of the first decoder embodiment can be understood from the above description and the description of the first coder embodiment. The interface circuit 70 supplies the dequantizing circuit 80 with coefficient and power information Ic and Io once per frame, and the excitation circuit 40 with index information once per subframe. The excitation circuit produces the optimum excitation signals (e) that were selected in the coder. The synthesis filter 114 filters these excitation signals, using the same dequantized linear predictive coefficients (aq) as in the coder, to produce the same synthesized speech signal Sw, which is modified by the post-filter 214 to obtain a more natural reproduced speech signal Sp.

From a coded speech signal recorded at a bit rate on the order of four thousand bits per second (4 kbits/s), the coder and decoder of this first embodiment can generate a reproduced speech signal Sp of noticeably improved quality. A bit rate of 4 kbits/s allows over an hour's worth of messages to be recorded in sixteen megabits of memory space, an amount now available in a single IC. A telephone set incorporating the first embodiment can accordingly add answering-machine functions with very little increase in size or weight.

One reason for the improved speech quality at such low bit rates is that the coefficient information Ic is coded by vector quantization of LSP coefficients. At low bit rates, relatively few bits are available for coding the coefficient information, so there is inevitably some distortion of the frequency spectrum of the vocal-tract model that the coefficients represent, due to quantization error. With LSP coefficients, a given amount of quantization error is known to produce less distortion than would be produced by the same amount of quantization error with linear predictive coefficients, because of the superior interpolation properties of LSP coefficients. LSP coefficients are also known to be well suited for efficient vector quantization.

A second reason for the improved speech quality is the provision of the pulse codebook 206, which is not found in conventional CELP systems. These conventional systems depend on the recycling of stochastic excitation signals through the adaptive codebook to produce periodic excitation waveforms, but at very low bit rates, the selection of signals is not adequate to produce excitation waveforms of a strongly impulsive character. The most strongly periodic waveforms, which occur at the onset and sometimes in the plateau regions of voiced sounds, have this impulsive character. By adding a codebook 206 of impulsive waveforms, the present invention makes possible more faithful reproduction of the most strongly impulsive and most strongly periodic speech waveforms.

A third reason for the improved speech quality is the conversion filter 109. It has been experimentally shown that the frequency characteristics of the waveforms that excite the human vocal tract resemble the complex frequency characteristics of the sounds that emerge from the speaker's mouth, and differ from the oversimplified characteristics of pure white noise or pure impulses. Filtering the stochastic and impulsive excitation signals (es and ep) to make their frequency characteristics more closely resemble those of the input speech signal S brings the excitation signal into better accord with reality, resulting in more natural reproduced speech. This improvement is moreover achieved with no increase in the bit rate, because the conversion filter 109 uses only information (Ia and aq) already present in the coded speech signal.

A further benefit of the frequency converter 109 is that emphasizing frequency components actually present in the input speech signal helps mask spurious frequency components produced by quantization error.

The combination of the pulse codebook 107 and conversion filter 109 provides an excitation signal that varies in shape, periodicity, and phase. This excitation signal is far superior to the pitch pulse found in conventional LPC vocoders, which varies only in periodicity. It is also produced more efficiently than would be possible with conventional CELP coding, which would require each of these excitation signals to be stored as a separate stochastic waveform.

The capability to switch between stochastic and impulsive excitation signals also improves the reproduction of transient portions of the speech signal. The overall perceived effect of the combined addition of the pulse codebook 107, conversion filter 109, and selector 113 is that speech is reproduced more clearly and naturally.

The impulse waveforms in the pulse codebook 107 could, incidentally, be produced by an impulse signal generator. Use of a pulse codebook 107 is preferred, however, because that simplifies synchronization of the impulsive and adaptive excitation signals, and enables the stochastic and pulse indexes Is and Ip to be processed in a similar manner.

Second Coder Embodiment

Figure 3:
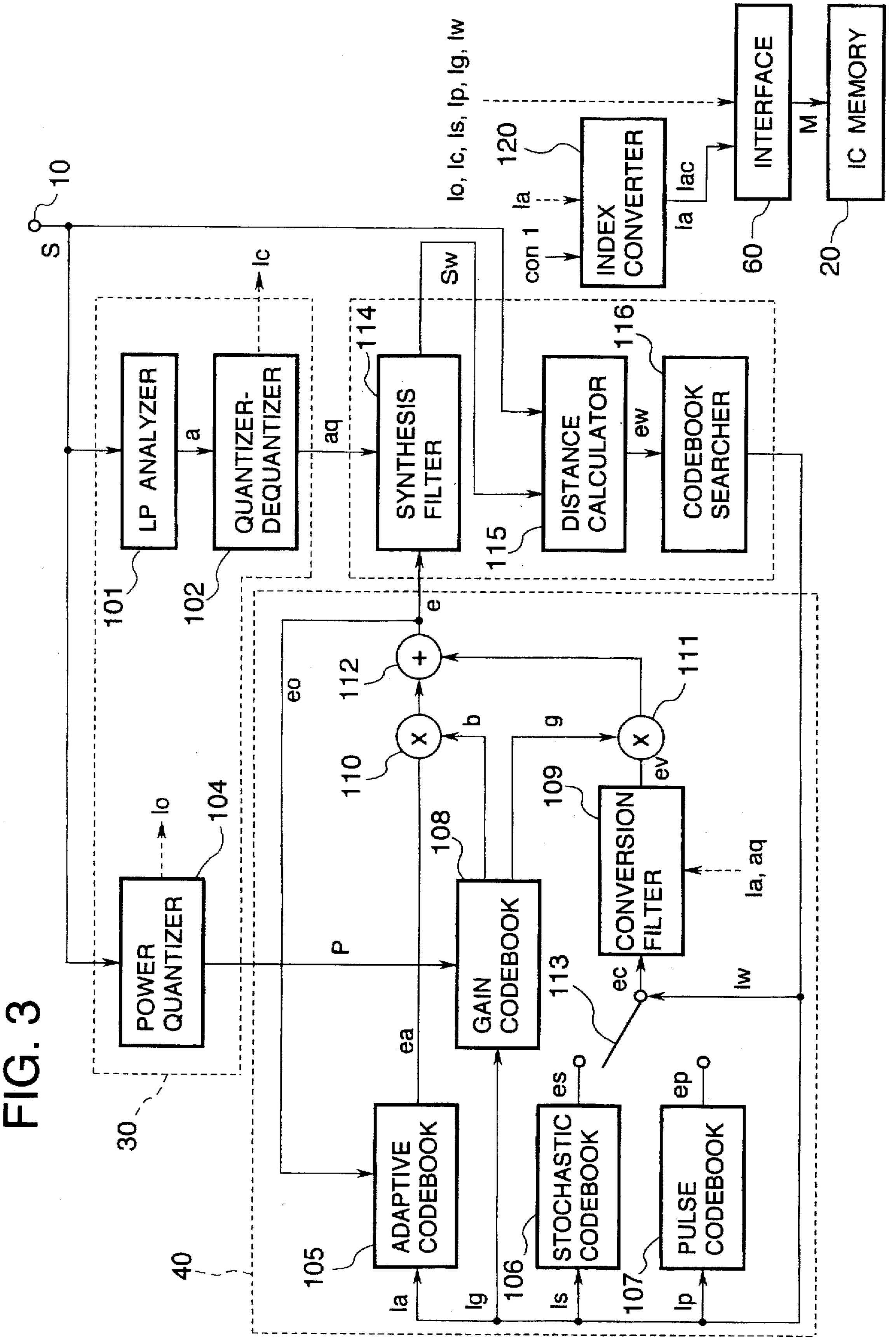
FIG. 3 is a block diagram of a second embodiment of the invented CELP coder.

FIG. 3 shows a second embodiment of the invented CELP coder, using the same reference numerals as in FIG. 1 to designate identical or equivalent parts. This coder enables messages to be recorded in a normal voice or monotone voice, at the user's option. The second coder embodiment is intended for use with the first decoder embodiment, shown in FIG. 2.

Monotone recording is useful in a telephone answering machine as a countermeasure to nuisance calls, applicable to both incoming and outgoing messages. For incoming messages, if certain types of nuisance calls are recorded in a monotone, they sound less offensive when played back. For outgoing messages, if the nuisance caller is greeted in a robot-like, monotone voice, he is likely to be discouraged and hang up. A further advantage of the monotone feature is that the telephone user can record an outgoing message without revealing his or her identity.

Referring to FIG. 3, the coder of the second embodiment adds an index converter 120 to the coder structure of the first embodiment. The index converter 120 receives a monotone control signal (con1) from the device that controls the telephone set, and the index (Ia) of the optimum adaptive excitation signal from the codebook searcher 116. When the monotone control signal (con1) is inactive, the index converter 120 passes the optimum adaptive index (Ia) to the interface circuit 60 without alteration. When the monotone control signal (con1) is active, the index converter 120 replaces the optimum adaptive index (Ia) with a fixed index (Iac), unrelated to the optimum index (Ia), and furnishes the fixed index (Iac) to the interface circuit 60. The monotone control signal (con1) is activated or deactivated in response to, for example, the press of a pushbutton on the telephone set.

As explained in the first embodiment, the adaptive index specifies the pitch lag. Supplied to both the adaptive codebook 105 and conversion filter 109, this index is the main determinant of the periodicity of the excitation signal, hence of the pitch of the synthesized speech signal. If a fixed adaptive index (Iac) is supplied to the adaptive codebook 105 and conversion filter 109 in place of the optimum index (Ia), the resulting excitation signal (e) will have a substantially unchanging pitch, and the synthesized speech signal (Sw) will have a flat, genderless, robot-like quality.

Other operations and effects of the second coder embodiment are the same as in the first embodiment.

Second Decoder Embodiment

Figure 4:
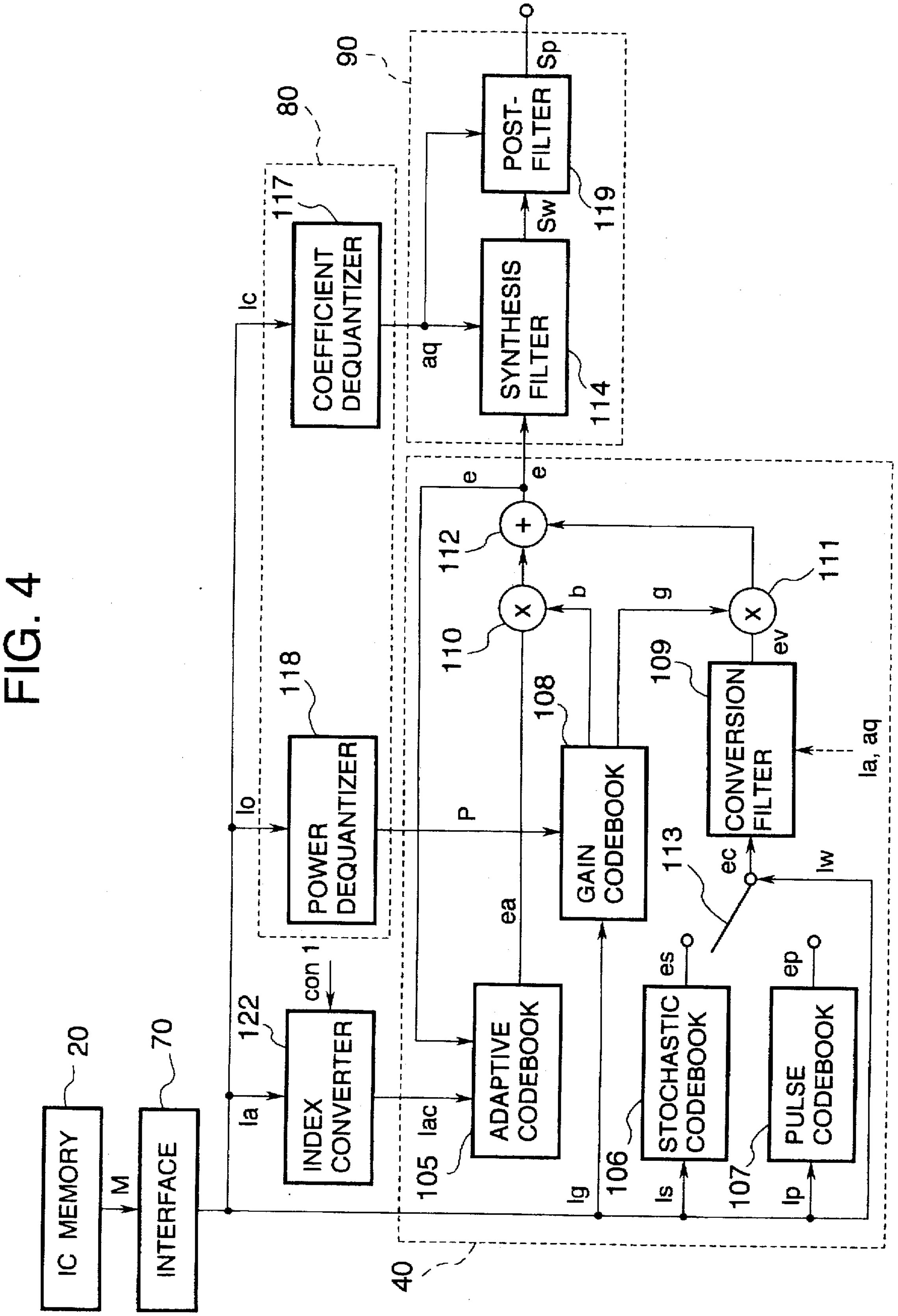
FIG. 4 is a block diagram of a second embodiment of the invented CELP decoder.

FIG. 4 shows a second embodiment of the invented CELP decoder, using the same reference numerals as in FIG. 2 to designate identical or equivalent parts. This decoder is intended for use with the first coder embodiment, shown in FIG. 1, to enable optional playback of the recorded speech signal in a monotone voice.

As can be seen from FIGS. 4 and 2, the second embodiment adds an index converter 122 to the decoder structure of the first embodiment, between the interface circuit 70 and excitation circuit 40. The index converter 122 receives a monotone control signal (con1) from the device that controls the telephone set, and the optimum adaptive index (Ia) from the interface circuit 70. When the monotone control signal (con1) is inactive, the optimum adaptive index (Ia) is passed to the adaptive codebook 105 and conversion filter 109 without alteration. When the monotone control signal (con1) is active, the index converter 122 replaces the optimum adaptive index (Ia) with a fixed index (Iac), unrelated to the optimum adaptive index (Ia), and supplies this fixed index (Iac) to the adaptive codebook 105 and conversion filter 109.

As in the second coder embodiment, when the monotone control signal (con1) is active, the excitation signal (e) has a generally unchanging pitch, and the reproduced speech signal (Sp) is substantially a monotone. For outgoing messages, the decoder in FIG. 4 provides the same advantages as the coder in FIG. 3. For incoming messages, the decoder in FIG. 4 provides the ability to decide, on a message-by-message basis, whether to play the message back in its natural voice or a monotone voice. Nuisance calls can then be played back in the inoffensive monotone, while other calls are played back normally.

Other operations and effects of the second decoder embodiment are the same as in the first embodiment.

Third Coder Embodiment

Figure 5:
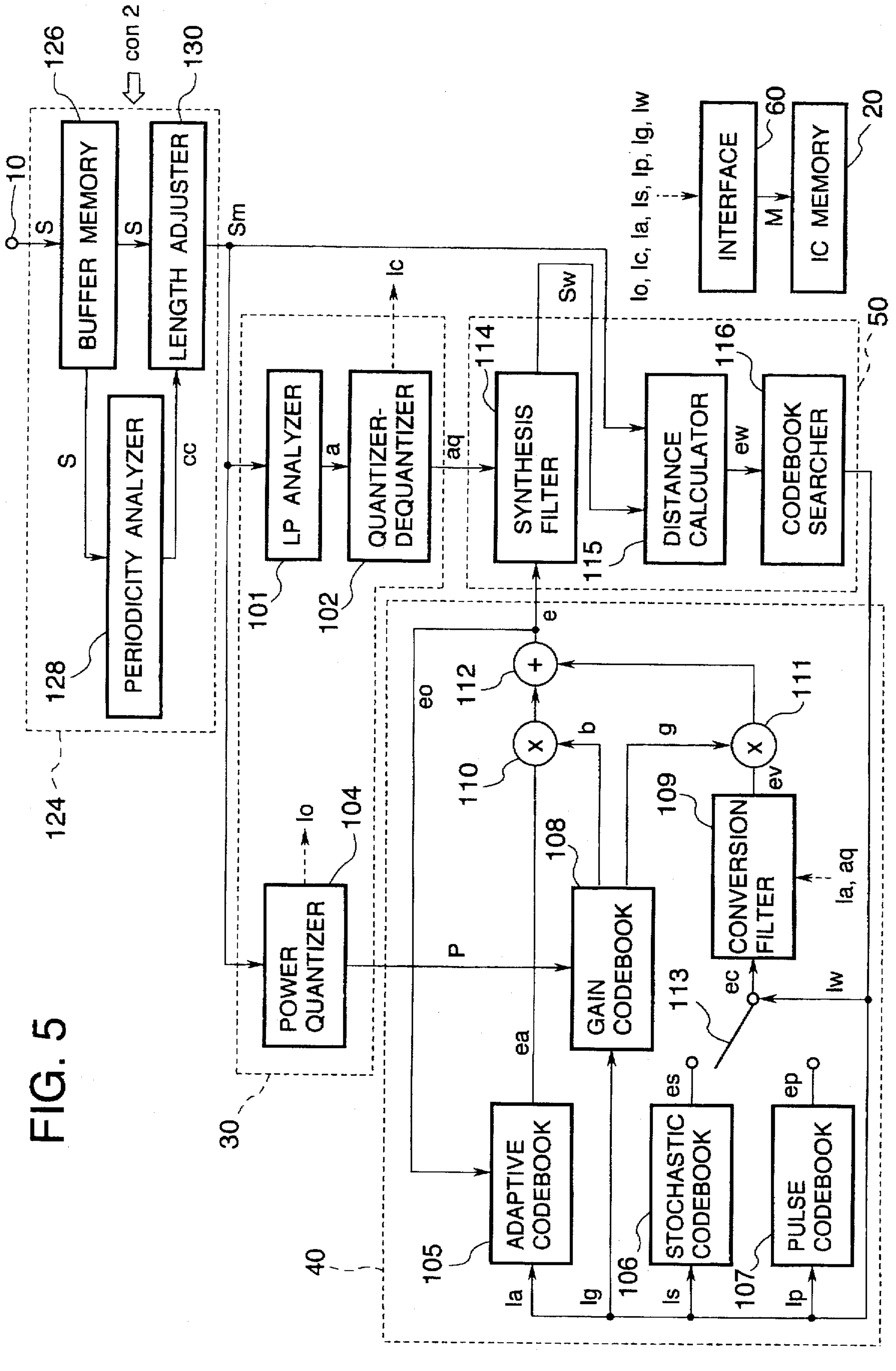
FIG. 5 is a block diagram of a third embodiment of the invented CELP coder.

FIG. 5 shows a third embodiment of the invented CELP coder, using the same reference numerals as in FIG. 1 to designate identical or equivalent parts. The third coder embodiment permits the speed of the speech signal to be converted when the signal is coded and recorded, without altering the pitch. This coder is intended for use with the first decoder embodiment, shown in FIG. 2.

As can be seen from FIGS. 5 and 1, the third coder embodiment adds a speed controller 124 comprising a buffer memory 126, a periodicity analyzer 128, and a length adjuster 130 to the coder structure of the first embodiment. The speed controller 124 is disposed in the input stage of the coder, to convert the input speech signal S to a modified speech signal Sm. The modified speech signal Sm is supplied to the analysis and quantization circuit 30 and optimizing circuit 50 in place of the original speech signal S, and is coded in the same way as the input speech signal S was coded in the first embodiment.

The speed controller 124 receives a speed control signal (con2) that designates a speed factor (sf). When the designated speed factor is unity (sf=1), the speed controller 124 does nothing, and the modified speech signal Sm is identical to the input speech signal S. When the speed factor is less than unity (sf<1), designating a speaking speed faster than normal, the speed controller 124 deletes samples from the input speech signal S to produce the modified speech signal Sm. When the speed factor is greater than unity (sf>1), designating a speed slower than normal, the speed controller 124 inserts extra samples into the input speech signal S to produce the modified speech signal Sm.

The speed control signal (con2) is produced in response to, for example, the push of a button on a telephone set. The telephone may have buttons marked fast, normal, and slow, or the digit keys on a pushbutton telephone can be used to select a speed on a scale from, for example, one (very slow) to nine (very fast).

In the speed controller 124, the buffer memory 126 stores at least two frames of the input speech signal S. The periodicity analyzer 128 analyzes the periodicity of each frame, determines the principal periodicity present in the frame, and outputs a cycle count (cc) indicating the number of samples per cycle of this periodicity.

The length adjuster 130 calculates the difference (di) between the fixed number of samples per frame (nf) and this number multiplied by the speed factor (nf×sf), then finds the number of whole cycles that is closest to this difference. That is, the length adjuster 130 finds an integer (n) such that n×cc is close as possible to the calculated difference (di). Conceptually, the difference (di) is divided by the cycle count (cc) and the result is rounded off to the nearest integer (n).

If this integer (n) is not zero, the length adjuster 130 proceeds to delete or interpolate samples. Samples are deleted or interpolated in blocks, the block length being equal to the cycle count (cc), so that each deleted or interpolated block represents one whole cycle of the periodicity found by the periodicity analyzer 128.

Figure 6:
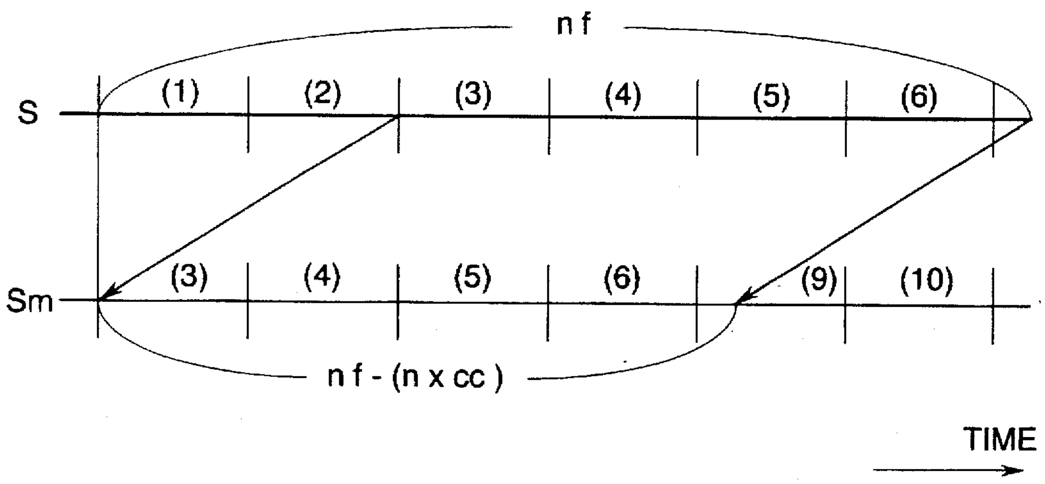
FIG. 6 is a diagram illustrating deletion of samples to speed up the reproduced speech signal.

FIG. 6 illustrates deletion when the frame length (nf) is three hundred twenty samples, the speed factor (sf) is two-thirds, and the cycle count (cc) is fifty. One frame of the input speech signal S, comprising three hundred twenty (nf) samples, is shown at the top, divided into cycles of fifty samples each. The frame contains six such cycles, numbered from (1) to (6), plus a few remaining samples.

The difference value (di) in this example is slightly more than one hundred samples, so the closest number of whole cycles is two (n=2). The length adjuster 130 accordingly deletes two whole cycles. The simplest way to select the cycles to be deleted is to delete the initial cycles, in this case the first two cycles (1) and (2), as illustrated. The modified speech signal Sm accordingly contains only the last two hundred twenty samples from this frame [nf−(n×cc)=320−(2×50)=220].

After similarly deleting cycles from the next frame, the length adjuster 130 reframes the modified speech signal Sm so that each frame again consists of three hundred twenty samples. The above two hundred twenty samples, for example, can be combined with the first one hundred non-deleted samples of the next frame, indicated by the numbers (9) and (10) in the drawing, to make one complete frame of the modified speech signal Sm.

Figure 7:
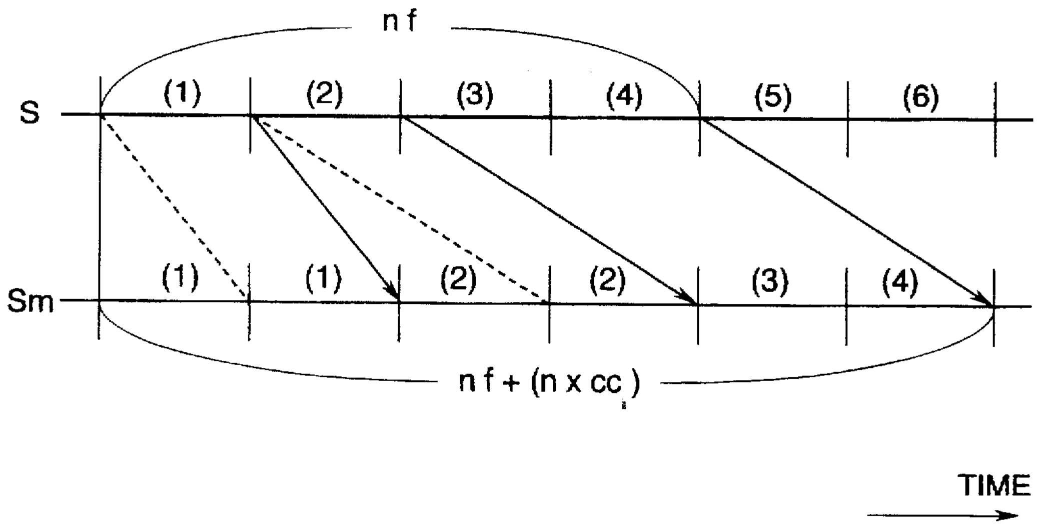
FIG. 7 is a diagram illustrating interpolation of samples to slow down the reproduced speech signal.

FIG. 7 illustrates interpolation when the frame length (nf) is three hundred twenty samples, the speed factor (sf) is 1.5, and the cycle count (cc) is eighty. One frame now consists of four cycles, numbered (1) to (4). The difference (di) is one hundred sixty samples, or exactly two cycles (n=2). The length adjuster 130 interpolates two whole cycles by, for example, repeating each of the first two cycles (1) and (2) in the modified speech signal Sm, as shown. The input frame is thereby expanded to four hundred twenty samples [nf+(n×cc)]. After interpolation, the modified speech signal Sm is reframed into frames of three hundred twenty samples each.

Operation of the other parts of the coder in FIG. 5 is the same as in the first embodiment, so a description will be omitted.

By deleting or interpolating whole cycles, the speed controller 124 can slow down or speed up the speech signal without altering its pitch, and with a minimum of disturbance to the periodic structure of the speech waveform. The modified speech signal Sm accordingly sounds like a person speaking in a normal voice, but speaking rapidly (if sf<1) or slowly (if sf>1).

One effect of speeding up the speech signal in the coder is to permit more messages to be recorded in the IC memory 20. If the speed factor (sf) is two-thirds, for example, the recording time is extended by fifty per cent. A person who expects many calls can use this feature to avoid overflow of the IC memory 20 in his telephone answering machine.

Another effect of speeding up the speech signal is, of course, that it shortens the playback time.

An effect of slowing down the speech signal is that recorded messages become easier to understand when played back.

Either speeding up or slowing down the outgoing greeting message recorded in a telephone answering machine is a possible deterrent to nuisance calls.

Third Decoder Embodiment

Figure 8:
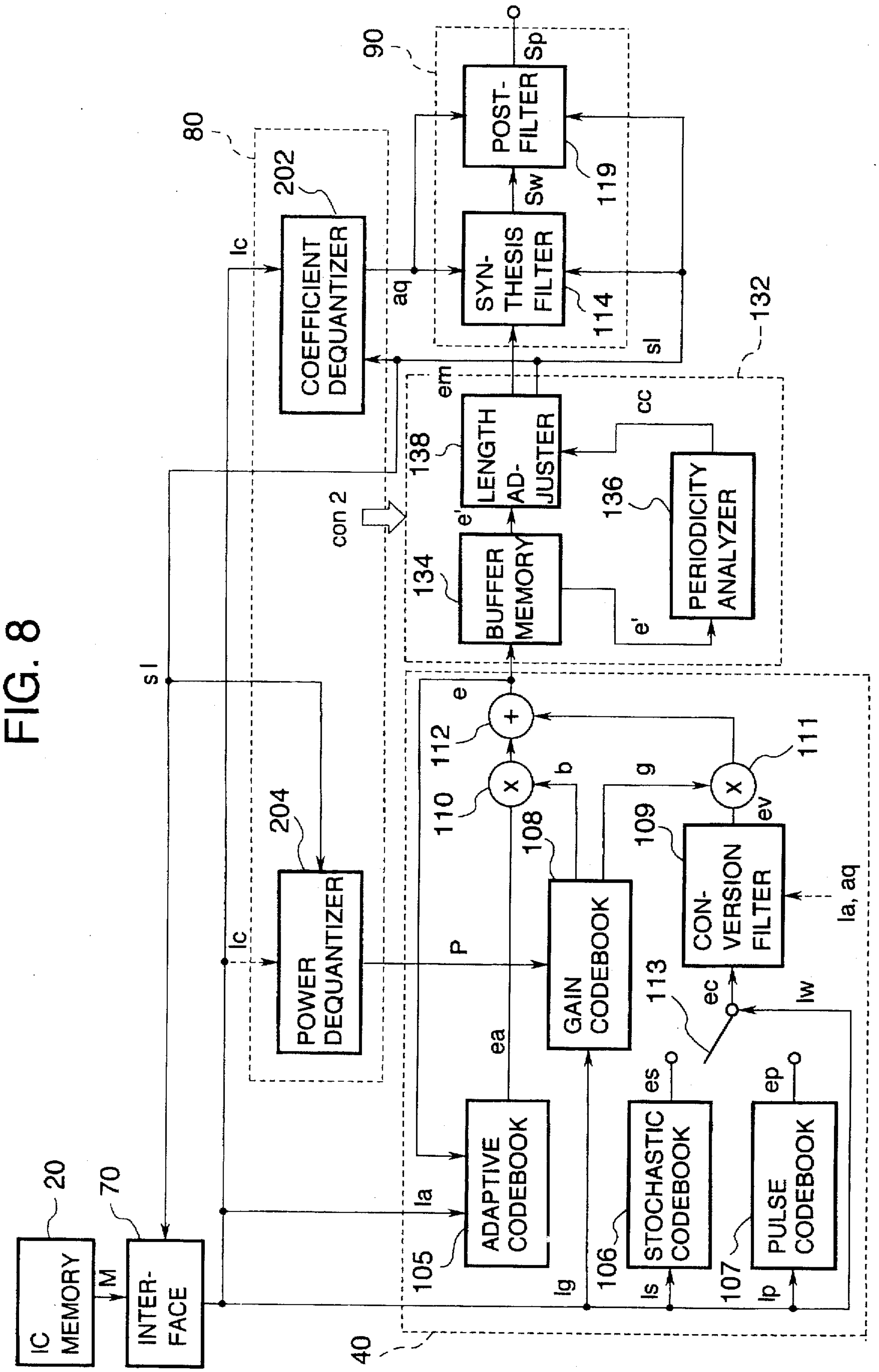
FIG. 8 is a block diagram of a third embodiment of the invented CELP decoder.

FIG. 8 shows a third embodiment of the invented decoder, using the same reference numerals as in FIG. 2 to designate identical or equivalent parts. The decoder of the third embodiment permits the speed of the speech signal to altered when the signal is decoded and played back, without altering the pitch. This decoder is intended for use with the coder of the first embodiment, shown in FIG. 1.

As can be seen from FIGS. 8 and 2, the third embodiment adds a speed controller 132 to the decoder structure of the first embodiment. The speed controller 132 is disposed between the excitation circuit 40 and filtering circuit 90, and operates on the excitation signal (e) to produce a modified excitation signal (em). The speed controller 132 is similar to the speed controller 124 in the coder of the third embodiment, comprising a buffer memory 134, a periodicity analyzer 136, and a length adjuster 138, which operate similarly to the corresponding elements 126, 128, and 130 in FIG. 5. The speed control signal (con2) designates a speed factor (sf), as in the third coder embodiment.

The buffer memory 134 stores the optimum excitation signals (e) output by the adder 112 over a certain segment with a length of at least one frame. The periodicity analyzer 136 finds the principal frequency component of the excitation signal (e) during, for example, one frame, and outputs a corresponding cycle count (cc), as described above. The length adjuster 138 deletes or interpolates a number of samples equal to an integer multiple (n) of the cycle count (cc) in the excitation signal (e), the samples being deleted or interpolated in blocks with a block length equal to the cycle count (cc). The multiple (n) is determined by the speed factor (sf) specified by the speed control signal (con2), as in the third coder embodiment.

After deleting or interpolating samples, the length adjuster 138 calculates the resulting frame length (sl) of the modified excitation signal (em), i.e., the number of samples in one modified frame, and furnishes this number (sl) to the interface circuit 70, dequantizing circuit 80, and filtering circuit 90. This number (sl) controls the rate at which the coded speech signal M is read out of the IC memory 20, the intervals at which new dequantized power values P are furnished to the excitation circuit 40, and the intervals at which the linear predictive coefficients (aq) are updated. Instead of reframing the excitation signal to a standard length, the length adjuster 138 instructs the other parts of the decoder to operate in synchronization with the variable frame length of the modified excitation signal (em).

Aside from using a variable frame length (sl), the other parts of the decoder operate as in the first embodiment, so further description will be omitted.

By shortening or lengthening the excitation signal as described above, the decoder in FIG. 8 can speed up or slow down the reproduced speech signal Sp without altering its pitch. The shortening or lengthening is accomplished with minimum disturbance to the periodic structure of the excitation signal, because samples are deleted or interpolated in whole cycles. Any disturbances that do occur are moreover reduced by filtering in the filtering circuit 90, so the reproduced speech signal Sp is relatively free of artifacts, apart from the change in speed. For this reason, deleting or interpolating samples in the excitation signal (e) is preferable to deleting or interpolating samples in the reproduced speech signal (Sp).

The third decoder embodiment provides effects already described under the third coder embodiment: in a telephone answering machine, recorded incoming messages can be speeded up to shorten the playback time, or slowed down if they are difficult to understand, and recorded outgoing messages can be reproduced at an altered speed to deter nuisance calls. One capability afforded by the third decoder embodiment is the capability to scan through a large number of messages at high speed (sf<1) to find a particular message, which is then played back at normal speed (sf=1). Another is the capability to play back desired calls at normal speed, and undesired or nuisance calls at a faster speed.

Fourth Decoder Embodiment

Figure 9:
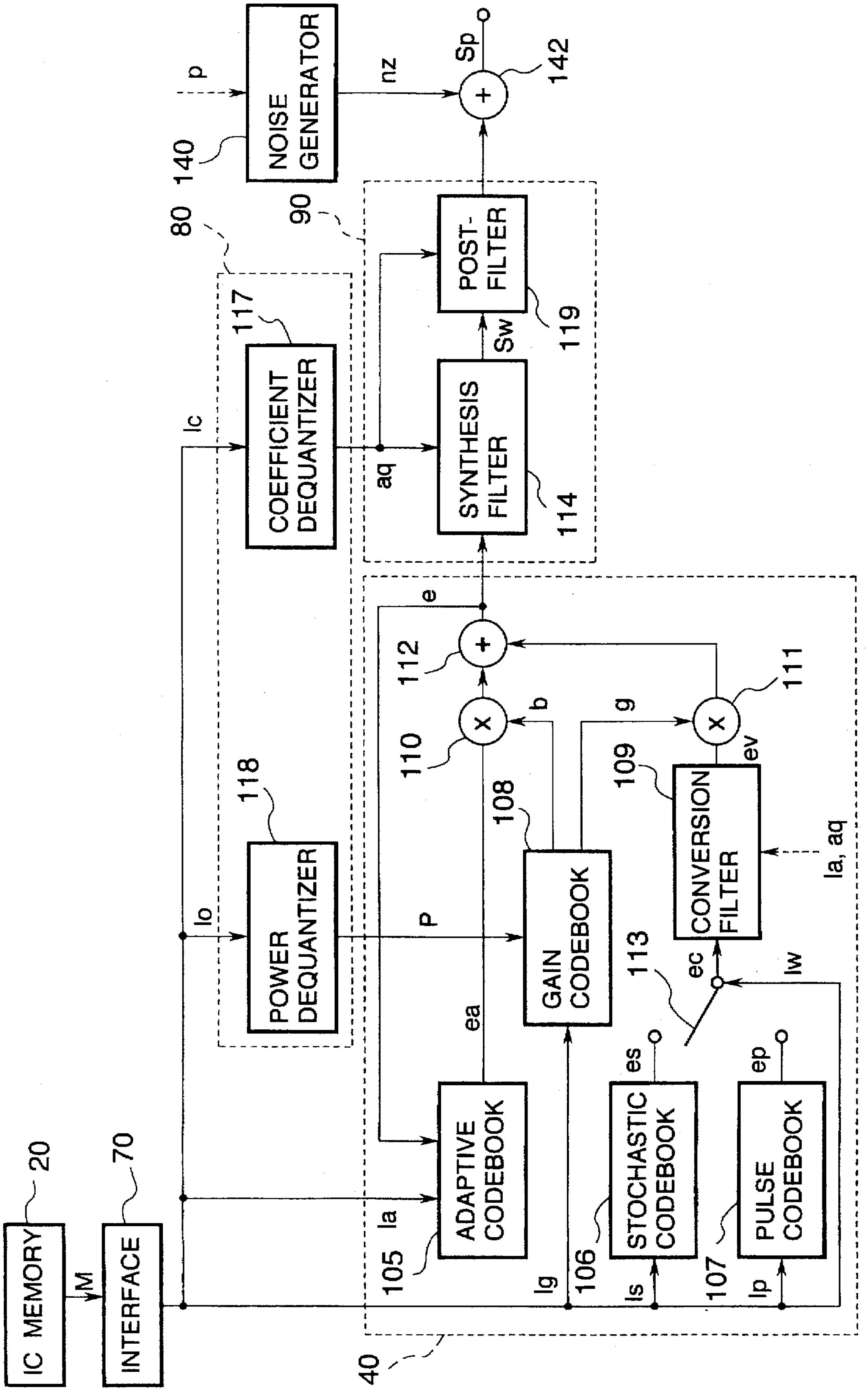
FIG. 9 is a block diagram of a fourth embodiment of the invented CELP decoder.

FIG. 9 shows a fourth embodiment of the invented CELP decoder, using the same reference numerals as in FIG. 2 to designate identical or equivalent parts. This fourth decoder embodiment is intended for use with the first coder embodiment shown in FIG. 1. The fourth decoder embodiment is adapted to mask pink noise in the reproduced speech signal.

Although the first embodiment reduces and masks distortion and quantization noise to a considerable extent, these effects cannot be eliminated completely; at very low bit rates the reproduced speech signal always has an audible coding-noise component. It has been experimentally found that the coding noise tends not to be of the relatively innocuous white type, which has a generally flat frequency spectrum, but of the more irritating pink type, which has conspicuous frequency characteristics.

A similar effect of low bit rates is that natural background noise present in the original speech signal is modulated by the coding and decoding process so that it takes on the character of pink noise.

Strictly speaking, pink noise is defined as having increasing intensity at decreasing frequencies. The term will be used herein, however, to denote any type of noise with a noticeable frequency pattern. Pink noise is perceived as an audible hum, whine, or other annoying effect.

As can be seen from FIGS. 9 and 2, the fourth decoder embodiment adds a white-noise generator 140 and adder 142 to the structure of the first decoder embodiment. The white-noise generator 140 generates a white-noise signal (nz) with a power responsive to the dequantized power value P. Methods of generating such noise signals are well known in the art. The adder 141 adds this white-noise signal (nz) to the speech signal output from the post-filter 214 to create the final reproduced speech signal Sp.

Aside from this final addition of a white-noise signal (nz), the fourth decoder embodiment operates like the first decoder embodiment. The white-noise signal (nz) masks pink noise present in the output of the post-filter 214, making the pink noise less obtrusive. The noise component in the final reproduced speech signal Sp therefore sounds more like natural background noise, which the human ear readily ignores.

Modified Excitation Circuit

FIG. 10 shows a modified excitation circuit, in which the stochastic and pulse codebooks 106 and 107 and selector 113 are combined into a single fixed codebook 150. This fixed codebook 150 contains a certain number of stochastic waveforms 152 and a certain number of impulsive waveforms 154, and is indexed by a combined index Ik. The combined index Ik replaces the stochastic index Is, pulse index Ip, and selection index Iw in the preceding embodiments.

As in the preceding embodiments, the stochastic waveforms represent white noise, and the impulsive waveforms consist of a single impulse each. The fixed codebook 150 outputs the waveform indicated by the constant index Ik as the constant excitation signal ec.

The other elements in FIG. 10 are identical to the elements with the same reference numerals in the preceding embodiments. FIG. 10 has been drawn to show more clearly the structure of the gain codebook 108, which stores pairs of gain values $b_k$ and $g_k$ (k=1, 2, . . . ).

FIG. 10 also shows the structure of the adaptive codebook 105. The final or optimum excitation signal (e) is shifted into the adaptive codebook 105 from the right end in the drawing, so that older samples are stored to the left of newer samples. When a segment 156 of the stored waveform is output as an adaptive excitation signal (ea), it is output from left to right. The pitch lag L that identifies the beginning of the segment 156 is calculated by, for example, adding a certain constant C to the adaptive index Ia, this constant C representing the minimum pitch lag.

The excitation circuit in FIG. 10 operates substantially as described in the first embodiment, and provides similar effects. The codebook searcher 116 searches the single fixed codebook 150 instead of making separate searches of the stochastic and pulse codebooks 106 and 107 and then choosing between them, but the end result is the same.

The excitation circuit in FIG. 10 can replace the excitation circuit 40 in any of the preceding embodiments. An advantage of the circuit in FIG. 10 is that the numbers of stochastic and impulsive waveforms stored in the fixed codebook 150 need not be the same.

Other Variations

The invention is not limited to the embodiments and modification described above, but has many possible variations, some of which are described below.

In the embodiments above, the codebook searcher 116 was described as making a sequential search of each codebook, but the coder can be designed to process two or more excitation signals in parallel, to speed up the search process.

The first gain value need not be zero during the searches of the stochastic and pulse codebooks, or of the constant codebook. A non-zero first gain value can be output.

Although the coder and decoder have been shown as if they were separate circuits, they have many circuit elements in common. In a device such as a telephone answering machine having both a coder and decoder, the common circuit elements can of course be shared.

Although preferably practiced with specially-designed integrated circuits, the invention can also be practiced by providing a general-purpose computing device, such as a microprocessor or digital signal processor (DSP), with programs to execute the functions of the circuit blocks shown in the drawings.

The embodiments above showed forward linear predictive coding, in which the coder calculates the linear predictive coefficients directly from the input speech signal S. The invention can also be practiced, however, with backward linear predictive coding, in which the linear predictive coefficients of the input speech signal S are computed, not from the input speech signal S itself, but from the locally reproduced speech signal Sw.

The adaptive codebook 105 was described as being of the shift type, that stores the most recent N samples of the optimum excitation signal, but the invention is not limited to this adaptive codebook structure.

Although the first embodiment prescribes an adaptive codebook, a stochastic codebook, a pulse codebook, and a gain codebook, the novel features of second, third, and fourth embodiments can be added to CELP coders and decoders with other codebook configurations, including the conventional configuration with only an adaptive codebook and a stochastic codebook, in order to reproduce speech in a monotone voice, or at an altered speed, or to mask pink noise.

The speed controllers in the third embodiment are not restricted to deleting or repeating the initial cycles in a frame as shown in FIGS. 6 and 7. Other methods of selecting the cycles to be deleted or repeated can be employed. The the unit within which deletion and repetition are carried out need not be one frame; other units can be used.

The white-noise signal (nz) generated in the fourth embodiment need not be responsive to the dequantized power value P. A white-noise signal with fixed variations, unrelated to P, could be used instead. A noise signal (nz) of this type can be stored in advance and read out repeatedly, in which case the noise generator 140 requires only means for storing and reading a fixed waveform.

The second, third, and fourth embodiments can be combined, or any two of them can be combined.

Although the invention has been described as being used in a telephone answering machine, this is not its only possible application. The invention can be employed to store messages in electronic voice mail systems, for example. It can also be employed for wireless or wireline transmission of digitized speech signals at low bit rates.

Those skilled in the art will recognize that other variations are also possible without departing from the scope claimed below.

What is claimed is:

1. A code-excited linear predictive coder for coding an input speech signal, comprising:

a power quantizer for calculating a power value of said input speech signal, quantizing said power value to obtain power information, and dequantizing said power information to obtain a dequantized power value;

a linear predictive analyzer for calculating linear predictive coefficients of said input speech signal;

a quantizer-dequantizer coupled to said linear predictive analyzer, for converting said linear predictive coefficients to line-spectrum-pair coefficients, quantizing said line-spectrum-pair coefficients to obtain coefficient information, then dequantizing said coefficient information to obtain dequantized line-spectrum-pair coefficients and converting said dequantized line-spectrum-pair coefficients back to linear predictive coefficients, thereby obtaining dequantized linear predictive coefficients;

an adaptive codebook for storing a plurality of candidate waveforms, modifying said candidate waveforms responsive to an optimum excitation signal, and outputting one of said candidate waveforms, responsive to an adaptive index, as an adaptive excitation signal;

a stochastic codebook for storing a plurality of white-noise waveforms, and outputting one of said white-noise waveforms, responsive to a stochastic index, as a stochastic excitation signal;

a pulse codebook for storing a plurality of impulsive waveforms, and outputting one of said impulsive waveforms, responsive to a pulse index, as an impulsive excitation signal;

a selector coupled to said stochastic codebook and said pulse codebook, for selecting a constant excitation signal by choosing between said stochastic excitation signal and said impulsive excitation signal, responsive to a selection index;

a conversion filter coupled to said selector, for filtering said constant excitation signal, responsive to said adaptive index and said dequantized linear predictive coefficients, to produce a varied excitation signal more closely resembling said input speech signal in frequency characteristics;

a gain codebook coupled to said power quantizer, for storing a plurality of pairs of gain values, outputting one of said pairs responsive to a gain index, and scaling said one of said pairs responsive to said dequantized power value, thereby producing a first gain value and a second gain value;

a first multiplier coupled to said gain codebook and said conversion filter, for multiplying said adaptive excitation signal by said first gain value to produce a first gain-controlled excitation signal;

a second multiplier coupled to said gain codebook and said adaptive codebook, for multiplying said varied excitation signal by said second gain value to produce a second gain-controlled excitation signal;

an adder coupled to said first multiplier and said second multiplier, for adding said first gain-controlled excitation signal and said second gain-controlled excitation signal to produce a final excitation signal;

an optimizing circuit coupled to said quantizer-dequantizer and said adder, for generating a synthesized speech signal from said final excitation signal and said dequantized linear predictive coefficients, comparing said synthesized speech signal with said input speech signal, and determining optimum values of said adaptive index, said stochastic index, said pulse index, said selection index, and said gain index, said optimum excitation signal being produced as said final excitation signal in response to said optimum values; and an interface circuit coupled to said optimizing circuit, for combining said optimum values, said power information, and said coefficient information to generate a coded speech signal.

2. The coder of claim 1, wherein the candidate waveforms stored in said adaptive codebook are past segments of said optimum excitation signal, starting at points designated by said adaptive index.

3. The coder of claim 1, wherein each of the impulsive waveforms stored in said pulse codebook consists of a single isolated impulse, disposed at a position designated by said pulse index.

4. The coder of claim 3 wherein, when said selector selects said impulsive excitation signal, said conversion filter produces a varied excitation signal consisting of pulse clusters with a shape responsive to said dequantized linear predictive coefficients, repeated at intervals determined by said adaptive index, starting from a position determined by said pulse index.

5. The coder of claim 1, wherein said stochastic codebook, said pulse codebook, and said selector are combined as a single fixed codebook storing both said white-noise waveforms and said impulsive waveforms, and said stochastic index, said pulse index, and said selection index are in the form of a single combined index.

6. The coder of claim 1, further comprising an index converter for supplying said interface circuit with a fixed adaptive index for inclusion in said coded speech signal in place of said optimum adaptive index, responsive to a control signal designating that said coded speech signal should represent speech of monotone pitch.

7. The coder of claim 1, further comprising a speed controller for detecting periodicity in said input speech and deleting portions of said input speech signal responsive to a speed control signal, the portions deleted by said speed controller having lengths corresponding to the periodicity detected by said speed controller.

8. The coder of claim 7, wherein said speed controller also interpolates new portions into said input speech signal responsive to said speed control signal, the portions interpolated by said speed controller having lengths corresponding to the periodicity detected by said speed controller.

9. A code-excited linear predictive decoder for decoding a coded speech signal created by the code-excited linear predictive coder of claim 1, comprising:

an interface circuit, for demultiplexing said coded speech signal to obtain coefficient information, power information, an adaptive index, a selection index, a constant index, and a gain index;

a coefficient dequantizer coupled to said interface circuit, for dequantizing said coefficient information to obtain line-spectrum-pair coefficients, and converting said line-spectrum-pair coefficients to dequantized linear predictive coefficients;

a power dequantizer coupled to said interface circuit, for dequantizing said power information to obtain a dequantized power value;

an adaptive codebook for storing a plurality of candidate waveforms, modifying said candidate waveforms responsive to a final excitation signal, and outputting one of said candidate waveforms, responsive to said adaptive index, as an adaptive excitation signal;

a stochastic codebook for storing a plurality of white-noise waveforms, and outputting one of said white-noise waveforms, responsive to said constant index, as a stochastic excitation signal;

a pulse codebook for storing a plurality of periodic impulsive waveforms, and outputting one of said periodic impulsive waveforms, responsive to said constant index, as an impulsive excitation signal;

a selector coupled to said stochastic codebook and said pulse codebook, for selecting a constant excitation signal by choosing between said stochastic excitation signal and said impulsive excitation signal, responsive to said selection index;

a conversion filter coupled to said selector, for converting said constant excitation signal, responsive to said adaptive index and said dequantized linear predictive coefficients, to produce a varied excitation signal more closely resembling said speech signal in frequency characteristics;

a gain codebook coupled to said power dequantizer, for storing a plurality of pairs of gain values, outputting one of said pairs responsive to said gain index, and scaling said one of said pairs responsive to said dequantized power value, thereby producing a first gain value and a second gain value;

a first multiplier coupled to said gain codebook and said adaptive codebook, for multiplying said adaptive excitation signal by said first gain value to produce a first gain-controlled excitation signal;

a second multiplier coupled to said gain codebook and said conversion filter, for multiplying said varied excitation signal by said second gain value to produce a second gain-controlled excitation signal;

an first adder coupled to said first multiplier and said second multiplier, for adding said first gain-controlled excitation signal and said second gain-controlled excitation signal to produce said final excitation signal; and a filtering circuit coupled to said first adder, for creating a reproduced speech signal from said dequantized linear predictive coefficients and said final excitation signal.

10. The decoder of claim 9, wherein the candidate waveforms stored in said adaptive codebook are past segments of said final excitation signal, said adaptive index denoting respective starting points of said segments.

11. The decoder of claim 9, wherein each of the impulsive waveforms stored in said pulse codebook consists of a single isolated impulse, said constant index denoting position of said single isolated impulse.

12. The decoder of claim 11 wherein, when said selector selects said impulsive excitation signal, said conversion filter produces a varied excitation signal consisting of pulse clusters with a shape responsive to said dequantized linear predictive coefficients, repeated at intervals determined by said adaptive index, starting from a position determined by said constant index.

13. The decoder of claim 9, wherein said stochastic codebook, said pulse codebook, and said selector are combined as a single fixed codebook storing both said white-noise waveforms and said impulsive waveforms, and said constant index, and said selection index are in the form of a single combined index.

14. The decoder of claim 9, further comprising an index converter for converting the adaptive index demultiplexed by said interface circuit to a fixed adaptive index, responsive to a control signal designating that said reproduced speech signal should have a monotone pitch.

15. The decoder of claim 9, further comprising a speed controller for detecting periodicity in said final excitation signal and deleting portions of said final excitation signal responsive to a speed control signal, the portions deleted by said speed controller having lengths corresponding to the periodicity detected by said speed controller.

16. The decoder of claim 15, wherein said speed controller also interpolates new portions into said final excitation signal responsive to said speed control signal, the portions interpolated by said speed controller having lengths corresponding to the periodicity detected by said speed controller.

17. The decoder of claim 9, further comprising:

a noise generator for generating a white-noise signal; and a second adder for modifying said reproduced speech signal by adding said white-noise signal to said reproduced speech signal.

18. An improved code-excited linear predictive coder of the type that receives and codes an input speech signal, the improvement comprising:

a speed controller for detecting periodicity in said input speech signal and deleting portions of said input speech signal responsive to a speed control signal, the portions thus deleted having lengths responsive to said periodicity.

19. The code-excited linear predictive coder of claim 18, wherein said speed controller also interpolates new portions into said input speech signal portions, responsive to said speed control signal, said new portions having lengths responsive to said periodicity.

20. The code-excited linear predictive coder of claim 19, wherein said input speech signal consists of samples, said samples are grouped into frames of a fixed number of samples, and said speed controller comprises:

a buffer memory for temporarily storing a plurality of said frames;

a periodicity analyzer coupled to said buffer memory, for analyzing the periodicity of each frame among said frames, and assigning to each said frame a cycle count corresponding to said periodicity; and a length adjuster coupled to said periodicity analyzer, for deleting from said frame at least one block of contiguous samples, equal in number to said cycle count, if said speed control signal designates a speed faster than normal speaking speed, and interpolating in said frame at least one block of contiguous samples, equal in number to said cycle count, if said speed control signal designates a speed slower than normal speaking speed.

21. The code-excited linear predictive coder of claim 20, wherein said length adjuster interpolates by repeating an existing block of contiguous samples in said frame.

22. The code-excited linear predictive coder of claim 20, wherein after interpolating, and after deleting, said length adjuster regroups said samples into new frames having said fixed number of samples each.

23. An improved code-excited linear predictive decoder of the type having an interface circuit for demultiplexing a coded speech signal to obtain index information and coefficient information, an excitation circuit for creating an excitation signal from said index information, and a filtering circuit for filtering said excitation signal according to said coefficient information to generate a reproduced speech signal, the improvement comprising:

a speed controller for detecting periodicity in said excitation signal, dividing said excitation signal into cycles according to said periodicity, and altering said excitation signal by deleting whole cycles of said excitation signal, responsive to a speed control signal.

24. The code-excited linear predictive decoder of claim 23, wherein said speed controller also interpolates whole cycles into said excitation signal, responsive to said speed control signal.

25. The code-excited linear predictive decoder of claim 24, said speed controller comprises:

a buffer memory for temporarily storing at least one segment of said excitation signal, consisting of a certain number of samples;

a periodicity analyzer coupled to said buffer memory, for analyzing the periodicity of said segment and assigning to said segment a corresponding cycle count; and a length adjuster coupled to said periodicity analyzer, for deleting from said segment at least one block of contiguous samples, equal in number to said cycle count, if said speed control signal designates a speed faster than normal speaking speed, and interpolating into said frame at least one block of contiguous samples, equal in number to said cycle count, if said speed control signal designates a speed slower than normal speaking speed.

26. The code-excited linear predictive coder of claim 25, wherein said length adjuster interpolates by repeating an existing block of contiguous samples in said segment.

27. An improved code excited linear predictive decoder of the type having an interface circuit for demultiplexing a coded speech signal generated by a speech coder, to obtain index information and coefficient information, an excitation circuit for creating an excitation signal from the index information, and a filtering circuit for filtering the excitation signal according to the coefficient information to generate a reproduced speech signal, the improvement comprising:

a white noise generator for adding white noise continuously to said reproduced speech.

28. The code-excited linear predictive decoder of claim 27, wherein said interface circuit also demultiplexes power information, and said white noise is generated responsive to said power information.

29. A method of generating an excitation signal for code-excited linear predictive coding and decoding of an input speech signal, comprising the steps of:

calculating linear predictive coefficients of said input speech signal;

calculating a power value of said input speech signal;

selecting an adaptive excitation signal, corresponding to an adaptive index, from an adaptive codebook;

selecting a stochastic excitation signal from a stochastic codebook;

selecting an impulsive excitation signal from a pulse codebook;

selecting a constant excitation signal by choosing between said stochastic excitation signal and said impulsive excitation signal;

selecting a pair of gain values from a gain codebook;

filtering said constant excitation signal, using filter coefficients derived from said adaptive index and said linear predictive coefficients, to convert said constant excitation signal to a varied excitation signal more closely resembling said input speech signal;

combining said varied excitation signal and said adaptive excitation signal according to said power value and said pair of gain values to produce a final excitation signal; and using said final excitation signal to update said adaptive codebook.

30. The method of claim 29, wherein calculating said linear predictive coefficients comprises the further steps of:

calculating line-spectrum-pair coefficients of said input speech signal;

quantizing said line-spectrum-pair coefficients to obtain coefficient information;

dequantizing said coefficient information to obtain dequantized line-spectrum-pair coefficients; and converting said dequantized line-spectrum-pair coefficients to said linear predictive coefficients.

31. The method of claim 29, wherein said adaptive codebook stores candidate waveforms comprising past segments of said final excitation signal, said adaptive index denoting respective starting points of said segments.

32. The method of claim 29, wherein said pulse codebook stores impulsive waveforms, each consisting of a single isolated impulse.

33. The method of claim 32 wherein, when said impulsive excitation signal is selected as said constant excitation signal, said conversion filter produces a varied excitation signal consisting of pulse clusters with a shape responsive to said linear predictive coefficients, repeated at intervals determined by said adaptive index, starting from a position determined by said pulse index.

34. The method of claim 29, wherein said stochastic codebook and said pulse codebook are combined as a single fixed codebook storing both stochastic excitation signals and impulsive excitation signals, from among which said constant excitation signal is selected directly.

35. The method of claim 29, comprising the further step of converting said adaptive index to a fixed value, responsive to a control signal designating monotone speech.

36. The method of claim 29, comprising the further steps of:

analyzing periodicity of said input speech signal to determine a cycle length of said input speech signal; and deleting portions of said input speech signal, having lengths equal to said cycle length, responsive to a speed control signal.

37. The method of claim 36, comprising the further step of interpolating new portions into said input speech signal, responsive to said speed control signal, said new portions having lengths equal to said cycle length.

38. The method of claim 29, comprising the further steps of:

analyzing periodicity of said final excitation signal to determine a cycle length of said final excitation signal; and deleting portions of said final excitation signal, having lengths equal to said cycle length, responsive to a speed control signal.

39. The method of claim 38, comprising the further step of interpolating new portions into said final excitation signal, responsive to said speed control signal, said new portions having lengths equal to said cycle length.

40. A method of decoding a coded speech signal, comprising the steps of:

demultiplexing said coded speech signal to obtain power information, coefficient information, an adaptive index, a constant index, a selection index, and a gain index;

dequantizing said power information to obtain a power value;

dequantizing said coefficient information to obtain linear predictive coefficients;

selecting an adaptive excitation signal from an adaptive codebook, responsive to said adaptive index;

selecting a stochastic excitation signal from a stochastic codebook, responsive to said stochastic index;

selecting an impulsive excitation signal from a pulse codebook, responsive to said pulse index;

selecting a constant excitation signal by choosing between said stochastic excitation signal and said impulsive excitation signal, responsive to said selection index;

selecting a pair of gain values from a gain codebook, responsive to said gain index;

filtering said constant excitation signal, using filter coefficients derived from said adaptive index and said linear predictive coefficients, to convert said constant excitation signal to a varied excitation signal;

combining said varied excitation signal and said adaptive excitation signal according to said power value and said pair of gain values to produce a final excitation signal;

using said final excitation signal to update said adaptive codebook;

filtering said final excitation with said linear predictive coefficients to generate a reproduced speech signal;

generating a white-noise signal; and adding said white-noise signal to said reproduced speech signal to generate an output speech signal.

41. The method of claim 40, wherein dequantizing said coefficient information comprises:

obtaining line-spectrum-pair coefficients from said coefficient information; and converting said line-spectrum-pair coefficients to said linear predictive coefficient.

42. The method of claim 40, wherein said stochastic codebook and said pulse codebook are combined as a single fixed codebook storing both stochastic excitation signals and impulsive excitation signals, from among which said constant excitation signal is selected.

43. An improved code excited linear predictive decoder of the type having an interface circuit for demultiplexing a coded speech signal generated by a speech coder, to obtain index information and coefficient information, an excitation circuit for creating an excitation signal from the index information, and a filtering circuit for filtering the excitation signal according to the coefficient information to generate a reproduced speech signal, the improvement comprising:

means, including a white noise generator, for masking a pink noise produced by the speech coder and present in the reproduced speech signal.

44. A code-excited linear predictive decoder of claim 43, wherein the interface circuit also demultiplexes power information, and the white noise generator is responsive to the power information.

45. A code-excited linear predictive coder for coding an input speech signal, comprising:

a power quantizer for calculating a power value of said input speech signal, quantizing said power value to obtain power information, and dequantizing said power information to obtain a dequantized power value;

a linear predictive analyzer for calculating linear predictive coefficients of said input speech signal;

a quantizer-dequantizer coupled to said linear predictive analyzer, for converting said linear predictive coefficients to line-spectrum-pair coefficients, quantizing said line-spectrum-pair coefficients to obtain coefficient information, then dequantizing said coefficient information to obtain dequantized line-spectrum-pair coefficients and converting said dequantized line-spectrum-pair coefficients back to linear predictive coefficients, thereby obtaining dequantized linear predictive coefficients;

an adaptive codebook for storing a plurality of candidate waveforms, modifying said candidate waveforms responsive to an optimum excitation signal, and outputting one of said candidate waveforms, responsive to an adaptive index, as an adaptive excitation signal;

a single fixed codebook for storing a plurality of white-noise waveforms and a plurality of impulsive waveforms, and outputting one waveform from among said white-noise waveforms and said impulsive waveforms, responsive to a single combined index, as a constant excitation signal;

a conversion filter coupled to said fixed codebook, for filtering said constant excitation signal, responsive to said adaptive index and said dequantized linear predictive coefficients, to produce a varied excitation signal more closely resembling said input speech signal in frequency characteristics;

a gain codebook coupled to said power quantizer, for storing a plurality of pairs of gain values, outputting one of said pairs responsive to a gain index, and scaling said one of said pairs responsive to said dequantized power value, thereby producing a first gain value and a second gain value;

a first multiplier coupled to said gain codebook and said conversion filter, for multiplying said adaptive excitation signal by said first gain value to produce a first gain-controlled excitation signal;

a second multiplier coupled to said gain codebook and said adaptive codebook, for multiplying said varied excitation signal by said second gain value to produce a second gain-controlled excitation signal;

an adder coupled to said first multiplier and said second multiplier, for adding said first gain-controlled excitation signal and said second gain-controlled excitation signal to produce a final excitation signal;

an optimizing circuit coupled to said quantizer-dequantizer and said adder, for generating a synthesized speech signal from said final excitation signal and said dequantized linear predictive coefficients, comparing said synthesized speech signal with said input speech signal, and determining optimum values of said adaptive index, said combined index and said gain index, said optimum excitation signal being produced as said final excitation signal in response to said optimum values; and an interface circuit coupled to said optimizing circuit, for combining said optimum values, said power information, and said coefficient information to generate a coded speech signal.

* * * * *